J. H. Blessing,

Piston Packing.

No. 112,770.   Patented Mar. 21, 1871.

Witnesses.

Inventor
James H. Blessing
by
Mason, Fenwick & Lawrence

United States Patent Office.

JAMES H. BLESSING, OF ALBANY, NEW YORK, ASSIGNOR TO HIMSELF AND FREDERICK TOWNSEND, OF SAME PLACE.

Letters Patent No. 112,770, dated March 21, 1871.

---

IMPROVEMENT IN PISTON-ROD PACKINGS.

---

The Schedule referred to in these Letters Patent and making part of the same

---

*To all whom it may concern:*

Be it known. that I, JAMES H. BLESSING, of Albany, in the county of Albany and State of New York, have invented a new and improved Packing; and I do hereby declare that the following is a full, clear, and exact description thereof, reference being had to the accompanying drawing making part of this specification, in which—

Similar letters of reference indicate corresponding parts in the several figures.

First. The nature of my invention consists in a vulcanized rubber cylinder made long enough to be compressed endwise and applied around split metallic rings, which form a cylinder shorter than the rubber cylinder, in combination with a steam-admitting stuffing-box or other chamber and a compression-gland of said chamber, all in such manner that the metallic packing-rings are inclosed and held together, the joints at the ends of the cylinder of metallic packing made steam-tight by endwise compression of the rubber cylinders, and the contact of the packing with the piston-rod maintained by pressure of steam upon the outer circumference of the rubber cylinder.

Second. It consists in having the inner surface of the above-mentioned metallic-packing cylinder so constructed that the steam, entering directly from the cylinder, between the packing and the piston-rod, will enter concentric channels of the respective sections of packing by means of intersecting cross-channels, which are arranged to break-joints.

In carrying out my invention for a piston-rod packing I use plain cylindric rings of brass or other proper material, cut through at one point of their rim, and having their edges chamfered and their inner surfaces concentrically grooved or channeled, such channels being intersected by the cuts or splits of the rings, and all of the rings except the outer being grooved and chamfered. The grooved and not grooved rings I bind together by the vulcanized rubber cylinder.

To enable others skilled in the art to understand my invention, I will explain its construction and operation.

In the accompanying drawing—

A represents a cylinder-head, on the external surface of which a chambered extension, B, is formed, which is provided with a cap, C.

Within the said chambered extension, and encircling the piston-rod D, is an India-rubber sleeve, G, inclosing a number of cut rings $b$ $b'$ $b'$ $b'$.

The rubber sleeve G is made a little longer than the chamber which receives it, so that when the cap C is secured in place an annular portion, $c$, on this cap, will compress the sleeve about its inclosed rings.

Figure 1:
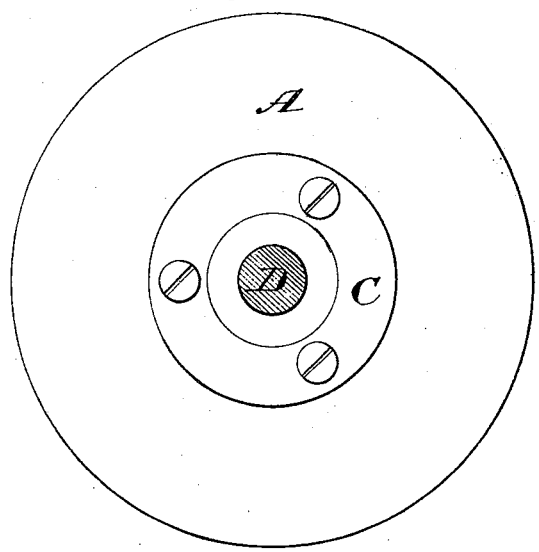
Figure 1 is an end view of the cap or head of a steam-cylinder having my invention applied to its stuffing-box.
Figure 2:
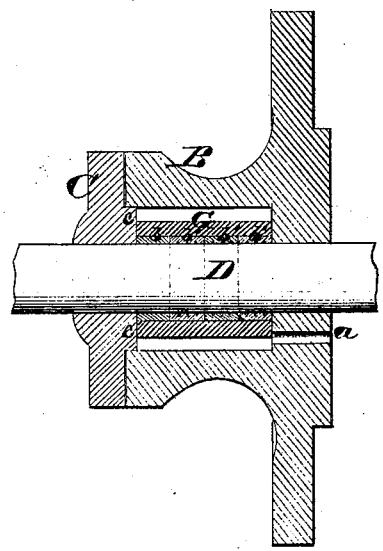
Figure 2 is a diametrical section through fig. 1, exposing the packing in its chamber.

This sleeve G is also made slightly smaller in diameter than the diameter of the chamber containing it, for the purpose of admitting steam to this chamber from the steam-cylinder through an aperture, $a$, shown in fig. 2. Steam thus admitted will operate to compress the elastic sleeve about its cut rings.

There are four rings, $b$ $b'$ $b'$ $b'$, represented in the drawing, figs. 2, 3, 4, and 5; but, if desirable, a greater or lesser number may be employed, according to circumstances.

Figure 3:
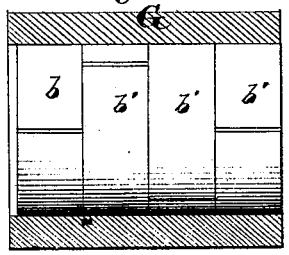
Figure 3 is an external view of the cut rings and a section through the elastic covering.
Figure 4:
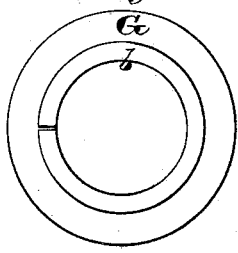
Figure 4 is an end view of the packing.
Figure 5:
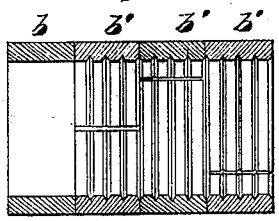
Figure 5 is a diametrical section through the cut rings.

The rings are all cut as shown in figs. 3, 4, and 5. The ring $b$, which is next to the cap C, is plain interiorly, that is to say, it has no grooves in its interior surface. The next ring $b'$ is grooved interiorly and chamfered on that edge opposite the ring $b$, but is not chamfered on that edge which abuts against this ring $b$. The other two rings $b'$ $b'$ are grooved interiorly and chamfered on both edges.

It will be seen that the rings $b'$ $b'$ $b'$ are grooved and chamfered in such manner that steam which enters the grooves in the first ring, or that which is next the cylinder-head, will pass from the grooves to cuts in the several rings until it reaches the last ring $b$, where it will be checked.

It should be understood that the splits or cuts of the rings all break joints with each other, so that the steam must circulate from a cut in one ring to a groove in an adjacent ring, and *vice versa*.

There will thus be a film of steam between the piston-rod and the packing, which will operate as a perfect lubricator and prevent undue friction between the opposed surfaces.

The object of the elastic sleeve G is to hold the rings in place and at the same time to prevent leakage and to compass the rings about the piston-rod D, so that any wear or inequalities will be compensated for.

In addition to the compression exercised by the sleeve the steam which is allowed to act upon it externally will cause it to hug the rings closely and keep their internal surfaces in close contact with the piston-rod D.

It will be seen that the thread of steam following the piston-rod strikes the chamfered edge of ring $b'$ and runs around to the split or slot, and entering, fills the remaining grooves of that ring and the groove formed by its upper chamfered edge and the chamfered edge of the adjoining rings $b'$. The steam then passes to the slot of said ring $b'$, and in like manner fills its grooves and passes on to the next adjoining ring $b'$, where, after filling its groove, it is stopped by reason of the upper edge of this ring not being chamfered and being placed in juxtaposition with the ring $b$, which is not grooved nor chamfered.

I have represented my invention applied to piston-rods, but it is obvious that it is applicable as a packing to rods of water as well as steam-engines or machines, and therefore I do not confine myself to steam-engine piston-rods.

Having described my invention,

What I claim as new, and desire to secure by Letters Patent, is—

1. The combination of the vulcanized rubber cylinder G, made long enough to be compressed endwise, in combination with the chamber B, compressible metallic sectional packing-cylinder $b\ b'\ b'\ b'$, gland C $c$, and steam inlet-passage $a$, all substantially in the manner and for the purpose herein described.

2. The channels formed on the compressible sectional packing-cylinder $b'\ b'$ with the chamfered edges, in the manner and for the purpose herein described.

3. The combination of the steam-channels and chamfered edges of the packing-rings with the intersecting splits of said rings, said intersecting splits being arranged to break-joints, substantially in the manner described and for the purpose set forth.

4. The combination of the split ring $b$, which is not grooved, with the split rings $b'$, which are chamfered and grooved, and with the vulcanized rubber cylinder G, chamber B, gland C $c$, and steam-passage $a$, substantially in the manner described.

JAMES H. BLESSING.

Witnesses:
 A. P. STUART,
 PETER G. CALLEN.